Dec. 29, 1959   F. E. FLETCHER ET AL   2,919,178
CHEMICAL DISSOLVER WITH FEED CONTROL
Filed May 19, 1955
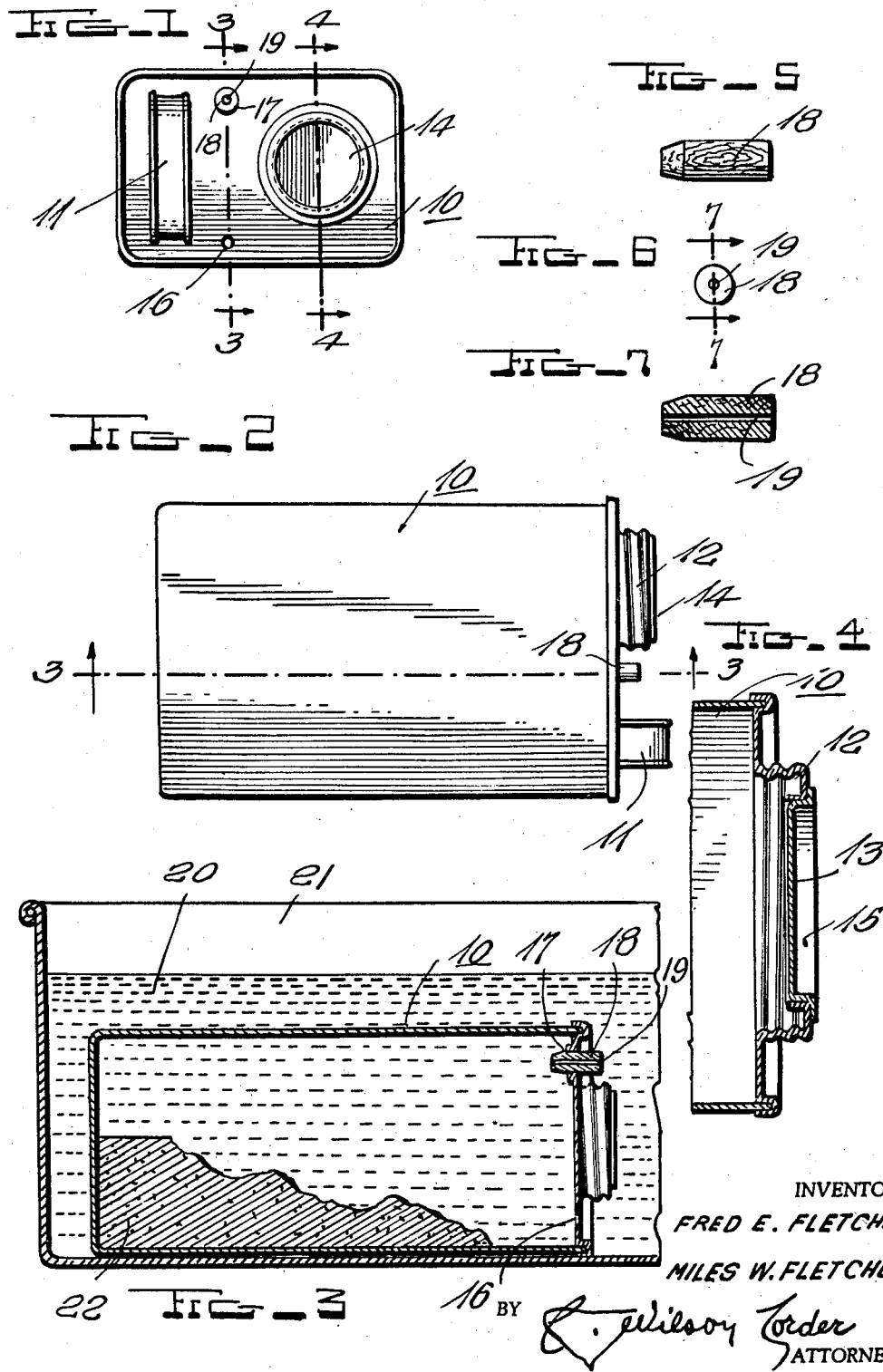
INVENTORS
FRED E. FLETCHER
MILES W. FLETCHER
BY
ATTORNEY United States Patent Office 2,919,178
Patented Dec. 29, 1959

2,919,178

CHEMICAL DISSOLVER WITH FEED CONTROL

Fred E. Fletcher and Myles W. Fletcher, Atlanta, Ga., assignors to Atlantic Chemical & Equipment Co., Atlanta, Ga., a corporation of Georgia Application May 19, 1955, Serial No. 509,501

1 Claim. (Cl. 23—267)

The present invention relates to the treatment of condenser water, with particular reference to that employed in air-conditioning systems and similar instrumentalities; said invention involving both a mechanical device and a method.

Since the early employment of air-conditioning systems, it has been found that the condenser water thereof as found in the drip pans generally used will contain undesirable foreign matter, usually in the nature of scale and algae which often results in a clogging up of the system, the building up of undesirable head pressures, and a lessening of the efficiency of the equipment plus a shortening of the life thereof.

The extent and seriousness of these troubles will depend in considerable part upon the nature of the water in a given locality, but broadly speaking, the problem is universal. In attempting to eliminate these unfavorable factors, various attempts have been made since early times to treat condenser water by placing therein various chemicals, but innovations thus employed have been generally unsatisfactory, chiefly because proper control factors have not been present, with the result that these procedures have been found to be both uneconomic from a standpoint of use of materials, expensive from a labor standpoint, and even dangerous at times in the light of safety considerations.

It will be noted that these same problems exist with reference to water treatment generally, as for example, in the chlorinating of swimming pools where the necessity of accurate controls has in the past required the employment of expensive and complicated machinery to insure the presence of the minute quantity of chlorine required in the water for sanitizing purposes, yet avoid over-chlorinating with attendant disagreeable if not dangerous consequences.

An object of this invention is to provide a can or container for a water treatment block, which provides an automatically controlled treatment of water.

Another object is to provide a container which automatically controls the diffusion into a body of water of a chemical or chemicals contained therein.

Another object is to make possible a continuous action of this type over a considerable period of time.

Another object is to make possible simplicity and economy in such treatment.

A still further object is to effect labor saving in such a conservation program.

Another object is to provide a dual action in the treatment of condenser water from a standpoint of killing algae.

These and other objects made possible by subject invention are more fully understood by reference to the drawing herein in which:

Fig. 1 is a top plan view showing the device of the instant invention;

Fig. 2 is a side view of the structure shown in Fig. 1;

Fig. 3 is an enlarged vertical sectional view, fragmentary in part, of the structure of Figs. 1 and 2, taken along the lines 3—3 thereof looking in the direction of the arrows;

Fig. 4 is an enlarged vertical sectional view, fragmentary in part, and with the cap removed, taken along the line 4—4 of Fig. 1, looking in the direction of the arrows;

Fig. 5 is a view in perspective illustrating the apertured plug of the instant device;

Fig. 6 is an end view of said plug; and

Fig. 7 is a view in longitudinal cross-section of the structure of Fig. 5 taken along the line 7—7 of Fig. 6.

Referring now to the drawing, 10 represents a metal container of substantially rectangular shape and contour, same having a carrying handle 11, and a threaded aperture 12 closed by a plug 13 and a cap 14, the space between the plug and the cap forming a compartment 15 in which may be placed a plurality of algaecide tablets of high potency, sodium pentachlorophenate being suggested in this connection.

Within the container proper, there is positioned, preferably through a moulding process, a solid fused block of condenser water treatment compound, said block containing a material calculated to inhibit the formation of scale such as sodium phosphate for example; more algaecide of a suitable nature, and a substance for combating rust and corrosion, sodium chromate being suggested for this purpose; the foregoing preferably to be combined in the ratios suggested heretofore in our pending patent application Serial No. 337,016, Corrosion Inhibitor and Receptacle Therefor, filed February 16, 1953, now abandoned.

It is likewise apparent that any other chemical or chemicals may be contained within can 10, as for example, chlorine in tablet or other form when the device is used for chlorinating swimming pool water.

Special attention is now directed to treatment feeder hole 16, which is placed in the top of can 10, this aperture being of a suitable size to permit a fluid to flow rapidly therethrough; and oppositely disposed air control hole 17. This latter opening is provided with a wooden plug or similar instrumentality 18 formed of a suitable water absorbent and porous material, positioned in which is an air hole 19, the purpose and function of which is explained during the further progress of this specification.

In operation, the cap 14 is first removed and the algaecide tablets of compartment 15 dropped into the water 20 of a drip pan 21, these serving to give what may be described as "shot" treatment for the quick kill of slime-forming algae in the system. Plug 13 remains in place throughout.

The container 10 is then placed on its side in the water with one hole 19 at a different depth from the other hole 16 and the device immediately commences to function, water entering through hole 16 from the difference in water pressure between the depth at hole 16 and the depth at hole 19, and coming into contact with the block 22 within the interior of the container, feeding rapidly through the said hole—builds up relatively fast when compared to the overall life of block 22 in the water the desired initial water treatment concentration in the drip pan. During this initial period of filling, any trapped air in container 10 above the level of block 22 has been removed and exhausted by replacement substantially by liquid thereby removing any air bubbles which could interfere with diffusion from the single remaining opening. If there is no air then this initial step is not present and the initial concentration begins to build and to move from the bottom hole. After this, the plug 18 swells and closes vent 19, which so reduces the flow into the can, and hence the feed rate of the treatment as to permit block 22 to remain effective for approximately thirty days, or other optimum period. Depending upon the type of porous, expansile material used for making plug 17, the swelling thereof and closing of hole 19 would be accomplished in a rather short period of time compared with and relative to the overall life of block 22 in water. The short initial period serves to remove any trapped air from the container and then to build up necessary concentration quickly so that diffusion can proceed without interference. The removal of trapped or contained air in the portion of container above the level of block 22 is especially advantageous when using containers which are not packed under vacuum conditions and are not intended to be vacuum packed containers but rather sealed or closed under ordinary atmospheric conditions. In this connection, it will be noted that the number of blocks employed depends largely upon the local water and the amount thereof being treated at a given time. The bleed-off rate plus windage loss should equal: Grains per gallon hardness×tons of refrigeration=pints per hour of operation. For example, a five grains per gallon hardness×50-ton system=250 pints per hour total bleed and windage.

Windage loss from atmospheric towers is usually enough up to six grains per gallon feed water hardness, and up to two grains for mechanical draft towers. All evaporative condensers require some bleed-off.

The action described herein is essentially that of diffusion, which may be defined as a spontaneous process of equalization of physical states. From a technical standpoint, if the concentration (mass of solid per unit volume of solution) at one surface of a layer of liquid is $d_1$ and at the other surface $d_2$, the thickness of the layer $h$ and the area under consideration A, then the mass of the substance which diffuses through the cross-section A in time $t$, is $$m = \Delta A \frac{(d_2 - d_1)t}{h}$$

where $\Delta$ is the coefficient of diffusion.

The above arrangement has been found to afford a simple and effective, as well as automatic, method of water treatment under the circumstances indicated, control vent 17—18—19 in its specialized surroundings serving to perform its function without the employment of extensive valves, hand controls or the like, thereby saving both materials, time and equipment. Economies thus effected are obvious.

While we have described in some detail the method of practicing our invention and a structure found particularly suitable therefor and thereto, no limitation is thus implied, it being intended that various modifications, reconstructions, changes, rearrangements, and the like may be resorted to without departing from the scope of the appended claim which is to be given an interpretation fairly in keeping with our contribution to the art.

We claim:

In a treatment apparatus for placing in a tank or the like of liquid for treating same chemically, a normally closed, liquid-tight container, a chemical treatment compound confined therein, said container having a first opening through which said treatment compound may diffuse when in contact with the liquid in said tank, said container having a second opening through which liquid can move, said second opening being positionable in said tank at a different depth than said first opening so that when air is in the container water will enter through said openings from the greater depth to the lesser depth, said liquid in said tank thereby substantially exhausting any air in said container from said second opening replacing said air by liquid, means on said container exposed to and responsive to the liquid in said tank to close said second opening after a short period of time from first placing said container in said liquid and in comparison with the relative life of a treatment compound in said tank, thereby stopping circulation from one depth to another through said second opening, said means responsive to the liquid being an absorptive plug in said second opening, a through opening in said plug initially communicating with said second opening to permit liquid to move therethrough, said opening in said plug being closed by the swelling of said plug in response to the liquid absorbed, said first opening thereafter remaining open in said tank and said initial filling having cleared said container of any trapped air therein, said chemical continuing to diffuse from said opening at a slower rate than during the initial circulation in comparison to the graduated life of said treatment compound in said tank by diffusion, whereby said amount of treatment compound in said tank is regulated to feed a heavy concentration of compound faster initially for a short period of time and said first opening thereafter remains open for slow diffusion of said treatment compound for the life thereof.

References Cited in the file of this patent
UNITED STATES PATENTS

| | | |
|---|---|---|
| 956,101 | Inglis | Apr. 26, 1910 |
| 967,450 | Sholes | Aug. 16, 1910 |
| 991,825 | Bogie | May 9, 1911 |
| 1,063,707 | Lummus | June 3, 1913 |
| 1,398,764 | Blum | Nov. 29, 1921 |
| 1,488,125 | Kline | Mar. 25, 1924 |
| 1,630,687 | Aulbach | May 31, 1927 |
| 1,736,890 | Sweeney | Nov. 26, 1929 |
| 1,803,860 | Marks | May 5, 1931 |
| 1,915,884 | Gericke | June 27, 1933 |
| 2,654,385 | Grosvenor | Oct. 6, 1943 |
| 2,672,878 | Hencken | Mar. 23, 1954 |